Oct. 28, 1969  C. D. RUSSELL  3,475,081
OUTSIDE MIRROR AND MAGNETIC POSITIONING MEANS
Filed Dec. 2, 1966  2 Sheets-Sheet 1
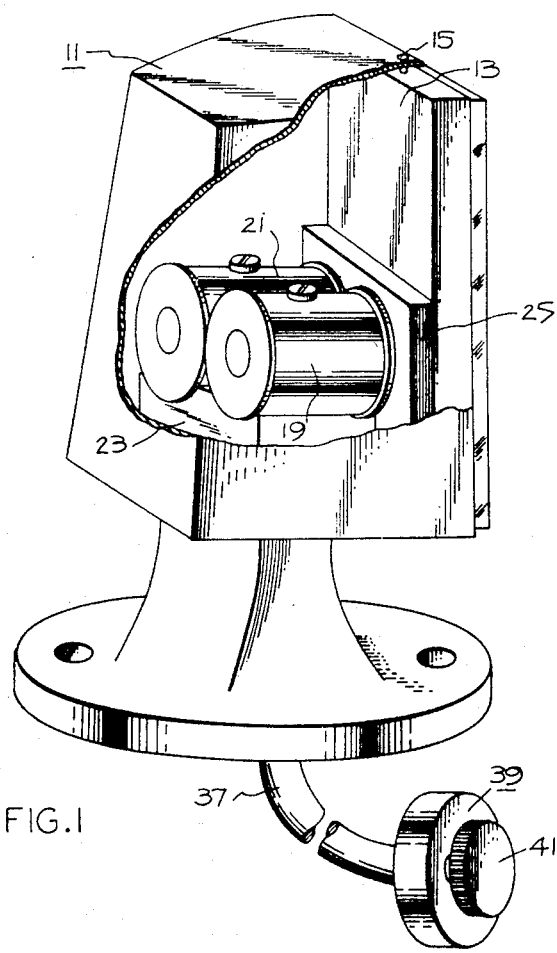
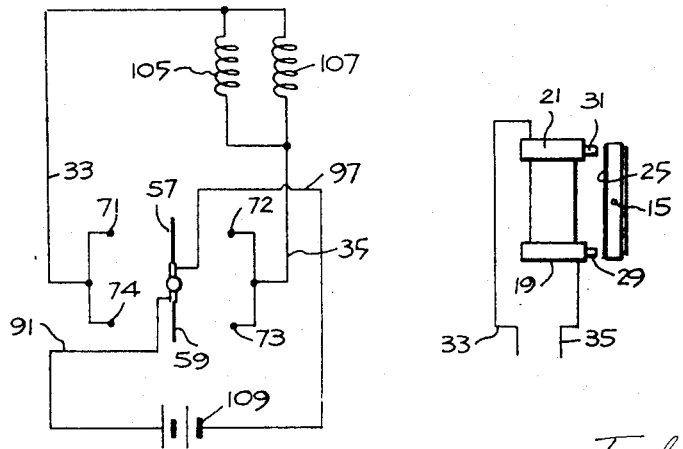
INVENTOR
CARL D. RUSSELL
BY Fisher, Christen, Sabol & Caldwell
ATTORNEYS Oct. 28, 1969  C. D. RUSSELL  3,475,081
OUTSIDE MIRROR AND MAGNETIC POSITIONING MEANS
Filed Dec. 2, 1966  2 Sheets-Sheet 2

INVENTOR
CARL D. RUSSELL

BY Fisher, Christen,
Sabol & Caldwell
ATTORNEYS

United States Patent Office 3,475,081
Patented Oct. 28, 1969

3,475,081
OUTSIDE MIRROR AND MAGNETIC POSITIONING MEANS
Carl D. Russell, Muskogee, Okla., assignor to Edward M. Carter, Oklahoma City, Okla., and Ralph H. Hamblin, Marion, Ohio
Filed Dec. 2, 1966, Ser. No. 598,745
Int. Cl. G02b 7/18, 17/00
U.S. Cl. 350—279
5 Claims

ABSTRACT OF THE DISCLOSURE

This invention relates to a vehicle mirror of the day-night type. Housing means support the mirror and case for pivotal movement. A permanent magnet is attached to the case and a pair of electromagnets is supported by the housing means. The electromagnets are polarized in the same direction and attract and repel the case magnet. The permanent magnet coming into contact with the core of one of the electromagnets causes the mirror to be locked into angled position even after the electromagnets are de-energized. Switching means select the polarization of the electromagnets and determine which position the mirror assumes.

---

Figure 4:
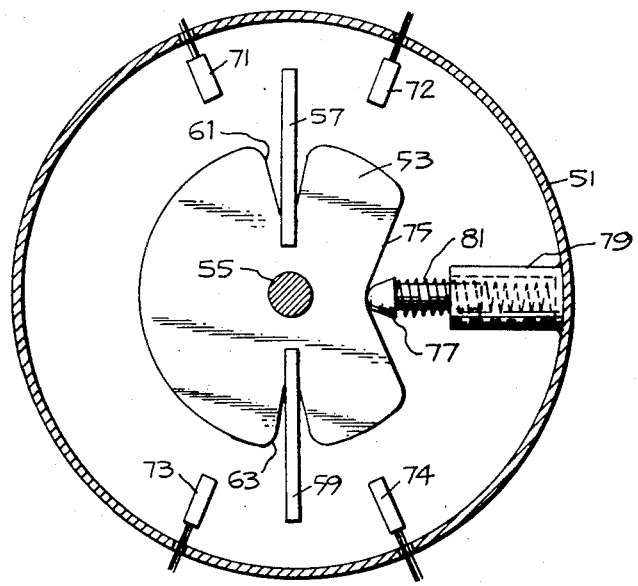

The present invention relates to apparatus for tilting or angling and locking a remote element and is described herein in respect to a so-called day-night type mirror, serving as a vehicular side-view mirror.

The invention makes use of both a bar magnet and electromagnets such that the energization of either electromagnet will produce the proper angling or panning of the mirror element by attraction established between the energized electromagnet and the bar magnet carried by the rear of the mirror case. Once the mirror has been angled, it is unnecessary to maintain energization of the electromagnet because the bar magnet establishes magnetic attraction with the core of the contacted electromagnet to lock or hold the mirror in the angled position, the cores serving as stops in either direction.

A feature of the invention resides in a momentary type switch which is preferably located within the vehicle (i.e., at a remote control station relative to the mirror) and which enables the vehicle operator to angle the mirror, away from the vehicle for night use or back to normal daylight position, at the flick of a knob, which energizes the electromagnets and which may then be released with the mirror locking in the angled position.

A further feature of the invention resides in the provision of such a switch in an electrical circuit extending from the electrical system of the vehicle to the coils of the electromagnets. This switch is resiliently biased to a home or off position and carries cantilever type spring blades which reverse the connection of the vehicle battery to the electromagnet coil upon slight rotation in opposite directions, the resilient means serving to return the switch to home position once it is released.

Yet another feature of the invention resides in the employment of spaced apart electromagnetic coils related to a north-south bar type magnet with the coils connected in parallel such that energization in one polarity causes a push-pull relation in one direction and energization in the opposite polarity causes a push-pull relation to pull the bar in the other direction. Thus, it may be appreciated that the flick of the control knob to the right or left will angle the mirror to the right or left, and it will be held by the permanent magnet although the knob is instantly released.

With the foregoing in mind, it is among the objects of this invention to provide a simple and inexpensive reliable arrangement for angling a mirror from a remote control station.

It is a further object to provide such an arrangement which simply and automatically locks the mirror in the desired position.

A still further object of the invention is to provide an arrangement of electromagnets which assist each other in the angling functions.

Yet another object of the invention is the provision of a simple reversing switch which automatically returns itself to home position upon release.

Figure 5:
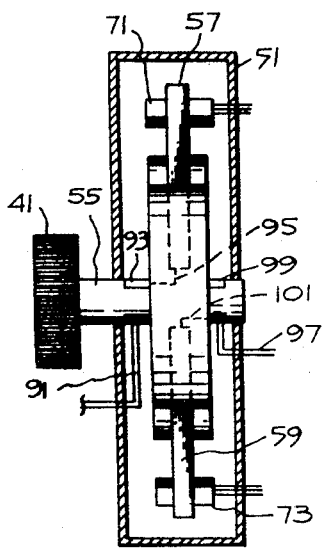

These and other objects and advantages of the invention will be appreciated from a reading of the following detailed description thereof when viewed in the light of the drawings wherein:

FIG. 1 is a view in perspective of a mirror assembly, partly broken away to reveal the internal components thereof, FIG. 2 is a schematic arrangement of the electromagnets relative to the mirror case and bar magnet, FIG. 3 is a circuit diagram for operation from the vehicle electrical system to reverse the polarity of the electromagnets, FIG. 4 is a view partly in plan and partly in section of an inexpensive but effective reversing switch with automatic home provision, and FIG. 5 is a view in cross section of the switch of FIG. 4.

In FIG. 1 a typical side view mirror housing 11 is shown pivotally mounting a mirror case 13 at pivot point 15, such that mirror element 17 may be pivoted relative to electromagnets 19 and 21, suitably fixed within the housing by frame 23.

Affixed to the rear surface of case 13 is a bar or strip magnet 25 which is preferably polarized in the usual north-south manner. The electromagnets 19 and 21 are spaced apart (as is best seen in FIG. 2) and their cores 29 and 31 are disposed near opposite ends of magnet 25.

The electromagnets are connected in parallel and energized over leads 33 and 35 (FIGS. 2 and 3) which extend via a cable 37 to a remotely located switch 39 having an actuating knob 41.

The switch is usually located within the vehicle to permit angling of the mirror away from the car whenever the reflected image is bothersome to the driver or passenger, whichever the case may be. This usually occurs at night, and angling of the mirror away from the car enables the driver to observe the second image rather than the first image which is troublesome.

The switch comprises a housing 51 shown in FIGS. 4 and 5 which supports a rotor 53 adapted to be turned by knob 41 via shaft 55. The rotor includes radial spring blades 57 and 59 which are secured thereto in rotor recesses 61 and 63. The material of the blades 57 and 59 is preferably of spring steel and the recesses are provided to permit better use of the resiliency of the switch blades in engaging contacts 71, 72, 73, and 74. The rotor 53 is further provided with a camming recess or peripheral groove 75 in cooperation with the plunger 77 disposed in tubular portion 79 of the housing 51 and urged against the rotor 53 by spring 81.

The recess 75 is shown somewhat exaggerated and would usually have a higher degree of curvature in order to assure returning of the rotor 53 to the home position (the position shown) when the operator removes his hand from knob 41.

Contact is made to the switch blade 57 by way of lead 91 connected to sleeve or partial sleeve 93 and extended via internal lead 95. Similarly connection is made to blade 59 over external lead 97, sleeve 99 and internal lead 101. Although a plurality of leads are shown in each instance, it is noted that a single lead will suffice for the application of this type control, as is best seen in FIG. 3.

In the circuit diagram of FIG. 3 coils 105 and 107 of electromagnets 19 and 21 are connected in parallel and are supplied power from the vehicle battery 109 vore leads 91 and 97 and via the control switch 39, for selective polarization in either direction. Thus contacts 72 and 73 are connected together to enable lead 35 to be negative when blade 57 makes contact with contact 72 and to be positive when blade 59 makes contact with contact 73. At the same time, the opposite polarity is applied to contact 71 and 74 respectively by the blades 57 and 59 in selective manner. Thus, blade 59 would make lead 33 positive when blade 57 made lead 35 negative to polarize the coils 105 and 107 in one direction for movement of bar magnet 25, mirror case 13, and mirror element 17 to one angled position wherein contact of the bar magnet 25 with one of the cores 29 and 31 of electromagnets 19 and 21 limits the angular movement with the bar magnet 25 serving to latch onto the selected core even when the knob 39 is released and the blades 57 and 59 spring back to the home position of FIG. 3 under the control of plunger 77 camming to center position along recess 75. The angle through which the mirror turns is small so the spacing between core 29 and 31 and magnet 25 is only a fraction of an inch as seen in FIG. 2.

Other and further modifications of this invention, within the principles herein taught, will probably occur to those skilled in the art, from a reading of the detailed description herein set forth, and it is intended that the invention be limited only by the appended claims wherein:

What is claimed is:

1. Apparatus for angling and locking a vehicular mirror and case comprising, in combination, housing means supporting the case and mirror for pivotal movement; a permanent magnet attached to the case; a pair of electromagnets supported by the housing means in spaced apart relation to each other and in proximity to the magnet; said electromagnets characterized by greater magnetic attractive strength than the permanent magnet; an electrical circuit for energizing the electromagnets from the vehicle electrical system; switching means in said circuit operable to connect the electromagnets to the electrical system in one polarity whereby the magnet is moved into contact with one of the electromagnets as a result of such energization and the magnetic attraction of the magnet for said one of the electromagnets retains the mirror in the angled position after said electromagnets are de-energized; said electromagnets oppositely angling the mirror upon energization in the opposite polarity by attracting the magnet into contact with the other of said electromagnets; said magnet maintaining the last-mentioned angled position of the mirror by permanent magnetic attraction.

2. The apparatus of claim 1 wherein said switching means comprises a support; a plurality of contacts in spaced apart relation carried by the support; a pair of leaf blades rotatably mounted on the support between different pairs of spaced contacts; and spring means normally urging the spring blades to non-contacting positions.

3. The switching means of claim 2 wherein the supporting means for the spring blades includes a contoured indentation in the periphery thereof and the resilient means comprises a plunger and a spring biasing the plunger into the contoured recess from the support.

4. The switching means of claim 3 wherein said electromagnets are connected in parallel and further including a pair of leads for supplying the electromagnets in the parallel connection.

5. The apparatus of claim 4 wherein said switching means comprises two right-hand and two left-hand contacts; a lead joining the right-hand contacts to each other and a lead joining the left-hand contacts to each other; said leads being respectively connected to said pair of leads.

References Cited
UNITED STATES PATENTS

| 1,053,096 | 2/1913 | Johnston. | |
| 1,217,759 | 2/1917 | Hamilton | 200—153.10 |
| 2,274,558 | 2/1942 | Murray. | |
| 2,806,408 | 9/1957 | Moeller | 350—279 |
| 3,000,262 | 9/1961 | Rabinow et al. | 350—279 |
| 3,198,892 | 8/1965 | Barcus et al. | 200—153.10 |

FOREIGN PATENTS 630,281  12/1961  Italy.

DAVID SCHONBERG, Primary Examiner

PAUL R. GILLIAM, Assistant Examiner